United States Patent [19]

Murchison

[11] 3,901,806
[45] Aug. 26, 1975

[54] TREATMENT OF AQUEOUS LIQUORS WITH URANYL IONS

[75] Inventor: Craig B. Murchison, Midland, Mich.

[73] Assignee: The Dow Chemical Company, Midland, Mich.

[22] Filed: Feb. 4, 1974

[21] Appl. No.: 439,452

[52] U.S. Cl............ 210/63; 21/DIG. 2; 204/157.1 R
[51] Int. Cl............................................. C02b 3/08
[58] Field of Search............ 210/63, 59, 50, 64, 48; 204/157.1; 21/DIG. 2, 58; 423/8, 10, 11, 261

[56] References Cited
UNITED STATES PATENTS
3,819,516  6/1974  Murchison et al..................... 210/63

OTHER PUBLICATIONS
Sakuraba et al., Photochemical Reactions of Uranyl Ions with Organic Compounds, Bull. Chem. Soc. of Japan, Vol. 43, pp. 1950–1955, (1970).

*Primary Examiner*—Thomas G. Wyse
*Assistant Examiner*—Benoit Castel
*Attorney, Agent, or Firm*—Stephen R. Wright

[57] ABSTRACT

Organic compounds present in an aqueous liquor are oxidized by mixing gaseous oxygen with liquor at a pH of about 3 to about 4.5 in the presence of a catalytic quantity of uranyl ions under irradiation by light ranging in wavelength from about 5800 to about 2000A to oxidize said organic materials into $CO_2$, water, and lower weight organics. Cupric ions may be added to prevent the formation of a uranium-containing precipitate, which may occur during the oxidation of certain organic compounds.

4 Claims, No Drawings

TREATMENT OF AQUEOUS LIQUORS WITH URANYL IONS

BACKGROUND OF THE INVENTION

There exist various physical, chemical and biological processes for treating organically polluted aqueous liquors to reduce the chemical and biological demand thereof.

In biological processes, purification is effected through the agency of micro-organisms, either bacteria or protozoa. The activated sludge process involves holding an organically polluted aqueous liquor in a sedimentation basin while it is aerated to effect oxidation of the organic matter through the agency of micro-organisms. This process has several disadvantages, such as the long periods of time required and the poisoning of the micro-organisms by constituents brought in by the aqueous liquor, e.g. halide ions or too great a concentration of phenols, etc. Also, there are problems associated with disposing of by-products formed by this process, e.g. sludge.

Another class of technology involves catalytically promoted oxidation processes. U.S. Pat. Nos. 2,690,425; 2,962,421 and 3,442,802 are examples of these types of processes. These processes are all characterized, however, by the drawback that when the catalyst is reduced in the process it must be replenished. For example, it is suggested in U.S. Pat. No. 2,962,421 that during the course of the reaction $Mn^{+4}$ is reduced to $Mn^{+2}$, the $Mn^{+2}$ being ineffective as an oxidation catalyst. There would be, accordingly, great utility in a catalytic oxidation process wherein the catalyst is autoregenerated in the reaction medium.

SUMMARY OF THE INVENTION

Organic compounds in an aqueous liquor are oxidized to produce at least $CO_2$ by mixing gaseous oxygen with said liquor while maintaining the pH thereof within the range of about 3 to about 4.5 in the presence of a catalytic quantity of uranyl ion (at least about 20 ppm) while said liquor is subjected to light waves ranging in length from about 5800 to about 2000A. Cupric ions may be added to the solution (in an amount of at least about 10 ppm) to prevent the formation of a uranium-containing precipitate, which may occur during the oxidation of certain organic compounds.

DETAILED DESCRIPTION OF THE INVENTION

Aqueous liquors containing oxidizable organic compounds such as waste streams which come from chemical plants, distilleries, smelters, sewage systems and the like can be treated according to the practice of the present invention to oxidize the organic compounds contained therein and to correspondingly reduce the chemical, biochemical and total oxygen demand (COD, BOD, TOD) of the liquor. The process can be used in conjunction with other known waste treatment processes if desired. The process operates most efficiently when substantially all of the organic compounds are dissolved in the aqueous liquor; moreover, many nondissolved compounds also are oxidized by the process of the present invention.

Classes of organic materials which can be oxidized in the present method include all organic compounds which form essentially water soluble complexes with uranyl ($UO_2^{+2}$) ions in an aqueous environment. Such organic compounds contain electron donor atoms such as oxygen, nitrogen, sulfur and other like atoms. Organic compounds which can be oxidized include, for example, aliphatic and aromatic carboxylic acids, e.g. formic, acetic, propionic, 2,4-dichlorophenoxy acetic, chloropropionic, phenoxyacetic, glycolic, chloroacetic, lactic, butyric acids; mono and polyhydric alcohols, e.g. methanol, ethanol, propanol, butanol, ethylene glycol, propylene glycol, butylene glycol, glycerine, etc., aldehydes, e.g. methyl acetate, ethyl acetate, propyl acetate, methyl formate, ethyl formate, propyl formate and higher molecular weight vaporizable esters; ketones such as acetone and other such similar chemicals as: dibasic acids, cyanogen compounds, amines, amides, carbohydrates, cellulosic materials, sugars, yeasts and the like.

The organic compounds can be present in amounts up to about the saturation level in the aqueous liquor. The process can be carried out in such aqueous liquors as, for example, concentrated brines, e.g. chloride brines and the like.

The products of oxidation include volatile products such as $CO$, $CO_2$ and $CH_4$ and water soluble and insoluble lower molecular weight organic compounds.

The process is carried out at a temperature ranging from the freezing point of the aqueous solution up to the boiling point thereof at atmospheric pressure. Elevated or reduced pressures can be employed if desired. The use of such pressures will of course effect the maximum and minimum of the temperature range. Elevated temperatures are not necessary to the practice of the invention, and, therefore, the process is preferably carried out at ambient atmospheric temperatures.

The aqueous liquor is continuously contacted with a source of oxygen, air, oxygen-fortified air and/or a compound which will give up oxygen under the other specified conditions of the invention. Generally it is preferred to provide more than a surface source of oxygen, i.e. more than that supplied by a holding pond in contact with the atmosphere. Mechanical methods of supplying aeration to the aqueous liquor which are well known in the art can be employed. Generally air under pressure is distributed into the aqueous system to be treated by the use of mechanical aeration devices and the like. Preferably, oxygen should be supplied in excess of that stoichiometrically required for oxidation of the organic compounds present in the aqueous liquor. The process can be practiced using oxidation ponds of which the depths, mixing, aeration techniques and the like are well known in the art. See for example the description of oxidation ponds in Kirk-Othmer's *Encyclopedia of Chemical Technology*, pages 122–123, Vol. 22, Second Edition.

A light source is also necessary in the practice of the present invention. An effective light source having a wavelength of less than about 5800A is utilized. Sunlight or any artificial supply of light can be employed in the process. Light sources, including the various lamps and the like which can be employed are well known in the art. Reference may be had to Kirk-Othmer's *Encyclopedia of Chemical Technology*, pages 331–354, Vol. 15, Second Edition, for a general discussion of photochemical technology including a detailed description of light sources and the like. Preferably, a light source having an effective wavelength between 4500 and 3000A is employed.

The aqueous liquor may be subjected to variable light quantities, depending on the amount of oxidation per unit time to be effected. Where substantially all the material in the aqueous liquor is to be oxidized, the energy dose of light used may range from about 0.1 to about 100 kilowatt-hours per pound of oxidizable organic to be oxidized. Generally less than 100 kilowatt-hours per pound of organic compound is sufficient.

The $UO_2^{+2}$ ion source may be selected from the many $UO_2^{+2}$ compounds whose anions do not hinder the oxidation reaction. Representative examples are $UO_2(NO_3)_2$, $UO_2SO_4$, $UO_2Cl_2$ and $UO_2Br_2$. Preferably the $UO_2^{+2}$ is soluble in the reaction system; however a portion may be present in a finely dispersed state. In the practice of the present invention it is theorized that the $UO_2^{+2}$ ion oxidizes the organic compounds and in the process is reduced to $U^{+4}$. The $U^{+4}$ species is thought to be reoxidized to the $UO_2^{+2}$ species by the oxygen present. Thus, the $UO_2^{+2}$ ion is autoregenerated in the present reaction medium, and only a catalytic amount of said $UO_2^{+2}$ ion need be provided in the liquor. The concentration of $UO_2^{+2}$ required will depend to some degree on the particular organic species and concentration thereof present, the natural extinction coefficient (transparency) of the liquor to be treated, temperature conditions, quantity of oxygen and the like, but is generally employed in an amount of about 20 ppm or greater. Rarely will more than 5000 ppm $UO_2^{+2}$ ion be required. A preferred range is from about 200 to about 2000 ppm of $UO_2^{+2}$ in the aqueous liquor.

In the oxidation of certain organic compounds a uranium containing precipitate is found to form and to settle out of solution, thereby depriving the aqueous liquor of a portion of the $UO_2^{+2}$ catalyst. In such cases, said precipitation may be prevented by initially providing a small but effective concentration of $Cu^{+2}$ ions in said solution.

The $Cu^{+2}$ ion source may be essentially any compound containing $Cu^{+2}$ whose anion does not hinder the instant oxidation of organic compounds. Representative compounds include $Cu(NO_3)_2$, $CuSO_4$ and $CuCl_2$. The $Cu^{+2}$ is employed in an amount sufficient to substantially prevent precipitation of an uranium containing compound. The appropriate concentration of $Cu^{+2}$ to prevent precipitation depends on such factors as the nature and concentration of the organic compound(s) present. Generally, concentrations of several hundred parts per million are employed; however, in certain cases as little as 10 ppm is sufficient, and rarely is more than 2000 ppm required to prevent the aforesaid precipitation.

It has been found important to the practice of the present invention that the pH of the aqueous solution should be precisely maintained in the range of 3–4.5 during the oxidation of the organic compounds present therein. Acids or acid producing materials such as HCl, $HNO_3$, $H_2SO_4$ or bases or alkalinity contributing materials such as NaOH can be employed to maintain the proper pH. A pH of about 3.5 is preferred. If, at the conclusion of the oxidation of the organic compounds, it is desired to recover the uranyl ions, precipitation thereof may be induced by increasing the pH to above 5, preferably to 8 or greater.

By practicing all the parameters of the present invention the COD, BOD and TOD of an organic compound containing aqueous liquor can be reduced. The products of the oxidation of the organics include $CO_2$ and, depending on the organic compounds present, other volatile carbon containing compounds such as CO, $CH_4$, other water soluble and water insoluble compounds. Solid compounds can be removed from the aqueous liquor by well known methods of flocculation, precipitation, filtration and the like.

Quantum yield as used herein is a measure employed in photochemical reactions to indicate the efficiency of the reaction system. Quantum yield is equal to the number obtained by dividing the moles of product formed or reaction products removed in the reaction system per einstein (moles of quanta) absorbed by the reactant. For example, a quantum yield equal to one means that one mole of product is formed for each einstein of photons absorbed by a reactant. Known methods may be employed for determining quantum yield. Actinometry, for example, is a method of determining the quantity of photons absorbed in a system. The actinometer is a device which can be employed for this determination. Other quantitative methods can be employed to determine the amount of product produced or the reactant used up and these quantities then can be employed to determine the quantum yield. In any reaction system employing a photochemical process it is generally preferred to maximize the quantum yield of the system. The present invention concerns a process for maximizing the quantum yield of photoautooxidation systems containing $UO_2^{+2}$ atoms as a portion of the reaction mechanism.

A quantity of an organic compound containing aqueous liquor is subjected to the parameters of the present invention for a sufficient period of time to oxidize a desired quantity of said compounds to form volatile, water insoluble or nonpolluting soluble products.

The following examples will facilitate a more complete understanding of the practice of the present invention.

EXAMPLE 1

In this example glycolic acid was oxidized by the method of the present invention in the presence of a 10 per cent by weight brine liquor. To 200 grams (g.) $H_2O$ were added 20 g. NaCl and 0.6 g. glycolic acid. To the liquor was then added 1.0 g. $UO_2(NO_3)_2 \cdot 6H_2O$, giving a uranyl ion concentration of 0.01 molar or 2700 ppm. The temperature of the liquor was maintained at 45°C, and the pH was maintained at 3.5. Gaseous oxygen was sparged into the liquor in an amount sufficient to saturate said liquor. Light from a Hilger Ramen Spectrometer mercury vapor light source was brought to bear on the liquor, providing wavelengths between 3000 and 4500A at a rate of approximately 0.063 Einsteins/hour.

During the early stage of the reaction (i.e. <37.5 min.) essentially only glycolic acid was being oxidized, and a quantum yield (based on carbon removal) of 0.244 was determined. Subsequently, organic by-products of the oxidation were increasingly formed and then oxidized by the present process, giving a quantum yield (based on carbon removal) of 0.017. The results of this run are summarized in Table I.

TABLE I

| Time (min.) | TOC (ppm) |
|---|---|
| 0 | 952 |
| 12.5 | 715 |
| 25.0 | 532 |
| 37.5 | 375 |
| 50.0 | 359 |
| 75.0 | 329 |

TABLE I-Continued

| Time (min.) | TOC (ppm) |
|---|---|
| 100.0 | 299 |
| 125.0 | 278 |
| 150.0 | 252 |

EXAMPLE 2

In this example the effect of the presence of salts, e.g. a brine, was investigated. In each of two runs, (a) and (b), 1.23 g. of $UO_2(NO_3)_2 \cdot 6H_2O$ and 2.234 g. glycolic acid were added to 250 g. $H_2O$, the pH of the solution was maintained at 3.5–4.0 and the temperature of the solution at 45°C. Oxygen was sparged into the liquors in an amount sufficient for saturation. The same light source utilized in Example 1 was used herein. To the liquor of run (b) was added 50 g. NaCl. The results of runs (a) and (b) are summarized in Table II.

TABLE II

| Run (a) No Salt | | Run (b) Salt (20% NaCl) | |
|---|---|---|---|
| Time (min) | TOC (ppm) | Time (min) | TOC (ppm) |
| 0 | 2860 | 0 | 2870 |
| 9 | 2630 | 13.6 | 2690 |
| 18 | 2500 | 27.1 | 2526 |
| 36 | 1820 | 40.7 | 2192 |
| 54 | 1205 | 54.2 | 1872 |
| quantum yield 0.61 | | quantum yield 0.37 | |

It is seen that although the presence of salts slows the TOC removal rate, significant TOC removal is still obtained.

EXAMPLE 3

In this example the effectiveness of the present invention to oxidize an aromatic compound was investigated. To a body of 200 g. of water was added 0.094 g. of 2,4-dichlorophenoxyacetic acid. To simulate an actual industrial waste, 30 g. of NaCl was added to the solution. One gram of $UO_2(NO_3)_2 \cdot 6H_2O$ was added to the solution. The pH was maintained at 3.0 and the temperature was maintained at 45°C. Oxygen was sparged into the solution to saturate it. The same light source utilized in Example 1 was used herein. In this test, some of the TOC removed was in the form of an insoluble solid mass which precipitated from the liquor. A quantum yield of 0.049 was obtained; the TOC removal is shown in Table III.

TABLE III

| Time (min) | TOC (ppm) |
|---|---|
| 0 | 160 |
| 9.9 | 104 |
| 19.8 | 74 |
| 39.8 | 38 |

EXAMPLE 4

In this example the effectiveness of the present invention to treat an actual industrial waste stream was investigated. A sample of a waste stream from an ethylcellulose production plant was procured which contained primarily ethanol and a compound very similar to ethoxy acetic acid and small amounts of acetic and formic acids. To a 200 ml. sample of this stream was added 1 gram of $UO_2(NO_3)_2 \cdot 6H_2O$. The pH of the liquor maintained at 3.5, the temperature was maintained at 45°C, and $O_2$ was sparged into the liquor to saturate it. The same light source utilized in Example 1 was again used. A quantum yield of 0.058 was obtained; the TOC removal is shown in Table IV.

TABLE IV

| Time (min) | TOC (ppm) |
|---|---|
| 0 | 1061 |
| 10 | 960 |
| 24 | 880 |
| 50.8 | 764 |
| 71.9 | 733 |
| 109.2 | 561 |
| 154.1 | 499 |

EXAMPLE 5

In this example the effect of the use of natural sunlight as a light source was investigated. A solution was formed of $H_2O$, 1.5 g. glycolic acid and 1 g. $UO_2(NO_3)_2 \cdot 6H_2O$. The solution was placed in a two liter evaporating dish which had a top diameter of 16.5 cm. Oxygen was supplied by air which came into contact with the solution. This test was conducted on a partly cloudy day and the temperature of the air was 16°C. The TOC removal is summarized in Table V.

TABLE V

| Time (Min) | TOC (ppm) |
|---|---|
| 0 | 1820 |
| 60 | 1490 |
| 140 | 1380 |
| 330 | 1200 |

EXAMPLE 6

In this example the effect of the addition of cupric ions to prevent precipitation of the catalytic uranyl ions was investigated. In each of two runs (a) and (b) 3.6 g. of dextrose was added to 1800 g. of $H_2O$. In both runs $O_2$ was sparged into the liquor to saturate it, the temperature was maintained at 28°C, and the pH was maintained at 3.5.

The light source was a 100 watt Hanovia mercury vapor lamp placed in a quartz light well which furnished light ranging in wavelength from about 2000 to about 4000Å at a rate of 0.033 einstein/hour. To the liquor of run (a) was added 9 g. $UO_2(NO_3)_2 \cdot 6H_2O$ but no $Cu^{+2}$ ion. To the liquor of run (b) was added 9.4 g. $UO_2(NO_3)_2 \cdot 3H_2O$ and 4.35 g. $Cu(NO_3)_2 \cdot 3H_2O$ (635 ppm $Cu^{+2}$).

TABLE VI

| Run (a) No $Cu^{+2}$ | | Run (b) $Cu^{+2}$ (635 ppm) | |
|---|---|---|---|
| Time (min) | TOC (ppm) | Time (min) | TOC (ppm) |
| 0 | 434 | 0 | 840 |
| 354 | 397 | 60 | 762 |
| 900 | 350 | 141 | 660 |
| Quantum yield 0.014 | | 240 | 450 |
| | | 480 | 240 |
| | | 600 | 170 |
| | | 680 | 122 |
| | | 890 | 91 |
| | | Quantum yield 0.23 | |

UNITED STATES PATENT OFFICE
CERTIFICATE OF CORRECTION

Patent No. 3,901,806          Dated August 26, 1975

Inventor(s) Craig B. Murchison

It is certified that error appears in the above-identified patent and that said Letters Patent are hereby corrected as shown below:

In the grant (Only) insert Column 7 and 8 as part of Letters Patent. 3,901,806

Signed and Sealed this

Twenty-first Day of September 1976

[SEAL]

Attest:

RUTH C. MASON
*Attesting Officer*

C. MARSHALL DANN
*Commissioner of Patents and Trademarks*

The liquor (a) was observed to turn very cloudy within 30 minutes, indicating the formation of a uranium-organic precipitate which impeded the TOC removal rate and quantum yield. The presence of cupric ions in the liquor of run (b) prevented such precipitation. Dextrose is an example of an organic compound which forms uranium containing precipitate during the course of the oxidation thereof; glycolic acid; 2,4-D; and ethyl cellulose are examples of organic compounds which do not form an uranium containing precipitate.

EXAMPLE 7

In this example the effectiveness of the present invention to treat a brewery plant waste was investigated on a sample containing, e.g. carbohydrates (e.g. sugars, starch), ethanol, aliphatic acids (e.g. acetic, propionic), yeasts and sanitary sewage. To 750 ml. of said waste was added 1050 ml $H_2O$, 9.4 g. $UO_2(NO_3)_2 \cdot 3H_2O$ (0.01 m $UO_2^{+2}$), and 4.4 g. $Cu(NO_3)_2 \cdot 3H_2O$ (0.01 m $Cu^{+2}$). The liquor was sparged with $O_2$ to saturation and was maintained at a temperature of 28°C and a pH of 3.5. The light source was the same as that used in Example 6. The TOC removal obtained is shown in Table VII.

TABLE VII

| Time (min) | TOC (ppm) |
|---|---|
| 0 | 308 |
| 64 | 271 |
| 147 | 263 |
| 266 | 257 |
| 615 | 187 |
| 1302 | 123 |

EXAMPLE 8

In this example the effect of pH on the present method was investigated. In each of five runs (a), (b), (c), (d) and (e) a solution of 1800 g. $H_2O$ containing 9.4 g. $UO_2(NO_3)_2 \cdot 6H_2O$ (0.01 m $UO_2^{+2}$), 4.35 g. $Cu(NO_3)_2 \cdot 3H_2O$ (0.01 m $Cu^{+2}$), and 3.6 g. dextrose was maintained at a temperature of 30°C, and was sparged with $O_2$ to saturation. The solution was irradiated by light from a 100 watt Hanovia mercury vapor lamp mounted in a pyrex light well to furnish wavelengths of from 3000 to 4500A at a rate of 0.024 einstein/hour. The liquors in the five runs were adjusted to different pH values and the different TOC removals obtained are shown in Table VIII.

TABLE VIII

| Run: | (a) | (b) | (c) | (d) | (e) |
|---|---|---|---|---|---|
| pH: | 1.2 | 2.2 | 3.3 | 4.3 | 5.5 |
| Time (min) | | | TOC (ppm) | | |
| 0: | 890 | 790 | 879 | 800 | 870 |
| 404: | 860 | 760 | 592 | 627 | 826 |
| Quantum yield: | 0.028 | 0.028 | 0.25 | 0.16 | 0.041 |

EXAMPLE 9

In this example the criticality of each of the parameters oxygen, light, and $UO_2^{+2}$ in the present method was investigated. In each of three runs (a), (b) and (c) the same solution tested in Example 8 was tested under the same conditions utilized therein, except that each of the present runs was conducted at a pH of 3.5 and in run (a) no oxygen was utilized, in run (b) no light was utilized and in run (c) no $UO_2^{+2}$ was utilized. The TOC removals obtained are shown in Table IX. For comparison, Run (c) of Example 8 is reproduced herein as Comparative (d), having been run at a pH of 3.3, which is very similar to the pH of each of the runs (a)–(c), i.e. 3.5.

TABLE IX

| Run Condition: | (a) No $O_2$ ($N_2$ sparge) | (b) no light | (c) no $UO_2^{+2}$ | Comparative (d) $O_2$, light, $UO_2^{+2}$ all present |
|---|---|---|---|---|
| Time (min) | | TOC (ppm) | | |
| 0: | 808 | 800 | 798 | 879 |
| 187: | 800 | 798 | 800 | 750 |
| 395: | 798 | 802 | 800 | 592 |

It is seen that each of the parameters of oxygen, light and uranyl ion is critical to the practice of the present invention.

What is claimed is:

1. A process for oxidizing organic compounds in an aqueous liquor wherein at least $CO_2$ is produced and wherein said organic compound contains an electron donating atom which comprises: mixing gaseous oxygen with the aqueous liquor while the pH of said liquor is maintained in the range of 3 to 4.5 in the presence of a catalytic quantity of uranyl ions of at least about 20 ppm while said liquor is subjected to light waves ranging in length from about 5800 to about 2000A at a temperature ranging from the freezing point to the boiling point of said aqueous liquor at atmospheric pressure and removing at least a major portion of said produced $CO_2$ thereby reducing the TOC of said liquor.

2. The process of claim 1 wherein the liquor additionally contains solubilized cupric ions in a concentration sufficient to prevent the formation of a uranium-containing precipitate, said concentration being at least 10 ppm.

3. The process of claim 1 wherein the concentration of uranyl ion ranges from about 200 to about 2000 ppm.

4. The process of claim 1 wherein the wavelength of the light waves ranges from about 4500 to about 3000A.

* * * * *